United States Patent
Hirano

(10) Patent No.: US 9,154,738 B2
(45) Date of Patent: Oct. 6, 2015

(54) COMMUNICATION DEVICE AND COMMUNICATION SYSTEM

(71) Applicant: Panasonic Corporation, Osaka (JP)

(72) Inventor: Jun Hirano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 109 days.

(21) Appl. No.: 14/236,211

(22) PCT Filed: Apr. 4, 2013

(86) PCT No.: PCT/JP2013/002739
§ 371 (c)(1),
(2) Date: Jan. 30, 2014

(87) PCT Pub. No.: WO2013/183214
PCT Pub. Date: Dec. 12, 2013

(65) Prior Publication Data
US 2014/0160226 A1  Jun. 12, 2014

(30) Foreign Application Priority Data

Jun. 7, 2012  (JP) .................................. 2012-129534

(51) Int. Cl.
H04N 7/14 (2006.01)
H04N 7/15 (2006.01)
H04M 3/56 (2006.01)

(52) U.S. Cl.
CPC .............. *H04N 7/155* (2013.01); *H04M 3/567* (2013.01); *H04N 7/15* (2013.01)

(58) Field of Classification Search
CPC ....................................................... H04N 7/14
USPC ........... 348/14.01, 14.08, 14.12, 14.07, 14.14
See application file for complete search history.

(56) References Cited

U.S. PATENT DOCUMENTS

| | | | |
|---|---|---|---|
| 2004/0205131 A1 | 10/2004 | Saruhashi et al. | |
| 2007/0107039 A1 | 5/2007 | Miyakawa et al. | |
| 2013/0093832 A1* | 4/2013 | Konda ....................... | 348/14.02 |

FOREIGN PATENT DOCUMENTS

| | | |
|---|---|---|
| JP | 02-280222 A | 11/1990 |
| JP | 09-294239 A | 11/1997 |

(Continued)

OTHER PUBLICATIONS

International National Search Report for Application No. PCT/JP2013/002739 dated Aug. 6, 2013.

*Primary Examiner* — Olisa Anwah
(74) *Attorney, Agent, or Firm* — Pearne & Gordon LLP

(57) ABSTRACT

A technique of enabling each communication device to share an image including the same image content in real time is disclosed. In a communication system including a plurality of communication devices for performing transmission and reception of content data with each other, where an instruction to acquire an image from specific video information included in the content data being transmitted or received and store the image has been input by a user, the communication device to which the image storage instruction has been input by the user transmits the image storage instruction to the plurality of communication devices in the communication system. Thus, each of the plurality of communication devices acquires the image from the specific video information being transmitted or received and stores the image based on the image storage instruction.

24 Claims, 6 Drawing Sheets

(56) References Cited

FOREIGN PATENT DOCUMENTS

| | | |
|---|---|---|
| JP | 11-282417 A | 10/1999 |
| JP | 2003-009105 A | 1/2003 |
| JP | 2003-091490 A | 3/2003 |
| JP | 2005-025399 A | 1/2005 |
| JP | 2007-011389 A | 1/2007 |
| JP | 2007-018517 A | 1/2007 |
| JP | 2007-159098 A | 6/2007 |
| JP | 4216308 B2 | 11/2008 |
| JP | 2009-294625 A | 12/2009 |
| JP | 2011-216984 A | 10/2011 |

* cited by examiner

COMMUNICATION DEVICE AND COMMUNICATION SYSTEM

TECHNICAL FIELD

The present disclosure relates to a communication device for transmitting or receiving content data including at least video information, and a communication system.

BACKGROUND ART

Techniques for realizing teleconferencing by bidirectional communication devices using video and audio between remote locations via a network are conventionally available to improve operational efficiency in various environments.

For instance, in the conference, video or images as a material used for the conference may be presented in addition to both attendees. The same content can be referred to in each location, for example by sharing the material beforehand or by placing data of the video or images in a server on the network separately.

In relation to the present disclosure, for example, a technique is disclosed in below-identified Patent Document 1. Patent Document 1 discloses a technique of comparing related information of content with other information to conduct search between communication devices in a point-to-point communication system and then presenting the corresponding content, thus enabling both parties to view the same content.

PRIOR ART DOCUMENTS

Patent Documents

Patent Document 1: Japanese Patent No. 4216308 (paragraph [0010])

SUMMARY OF THE INVENTION

However, for example, sharing content beforehand requires preparation. Besides, content changing in real time cannot be shared beforehand. The system of storing content beforehand as described in Patent Document 1 therefore has problems that it lacks ease of preparation and also does not support content changing in real time during communication.

To solve the problems stated above, for example, an aspect of the present disclosure enables each communication device to share an image including the same image content in real time.

For example, an aspect of the present disclosure includes a communication system including a plurality of communication devices for performing transmission and reception of content data with each other, wherein each of the plurality of communication devices performs a process of acquiring an image from video information and storing the image based on an image storage instruction in the case where the image storage instruction to acquire the image from the video information included in the content data transmitted and received in the communication system and store the image has been input to one of the plurality of communication devices.

With the structure described above, each communication device can share an image including the same image content in real time, while reducing traffic.

Note that an aspect of the present disclosure may be realized not by the communication system described above but by a communication device or the like.

According to an aspect of the present disclosure, for example the communication system described above enables each communication device to share an image including the same image content in real time.

The effects and advantages of the present disclosure are not limited to the above, and additional effects and advantages will be apparent from the disclosure of the specification and drawings. The additional effects and advantages may be, for example, individually provided by various embodiments and features disclosed in the specification and drawings, and not all effects and advantages need to be provided according to an aspect of the present disclosure.

DESCRIPTION OF EMBODIMENTS

The following describes an aspect of the present disclosure with reference to drawings.

(System Structure)

Figure 1:
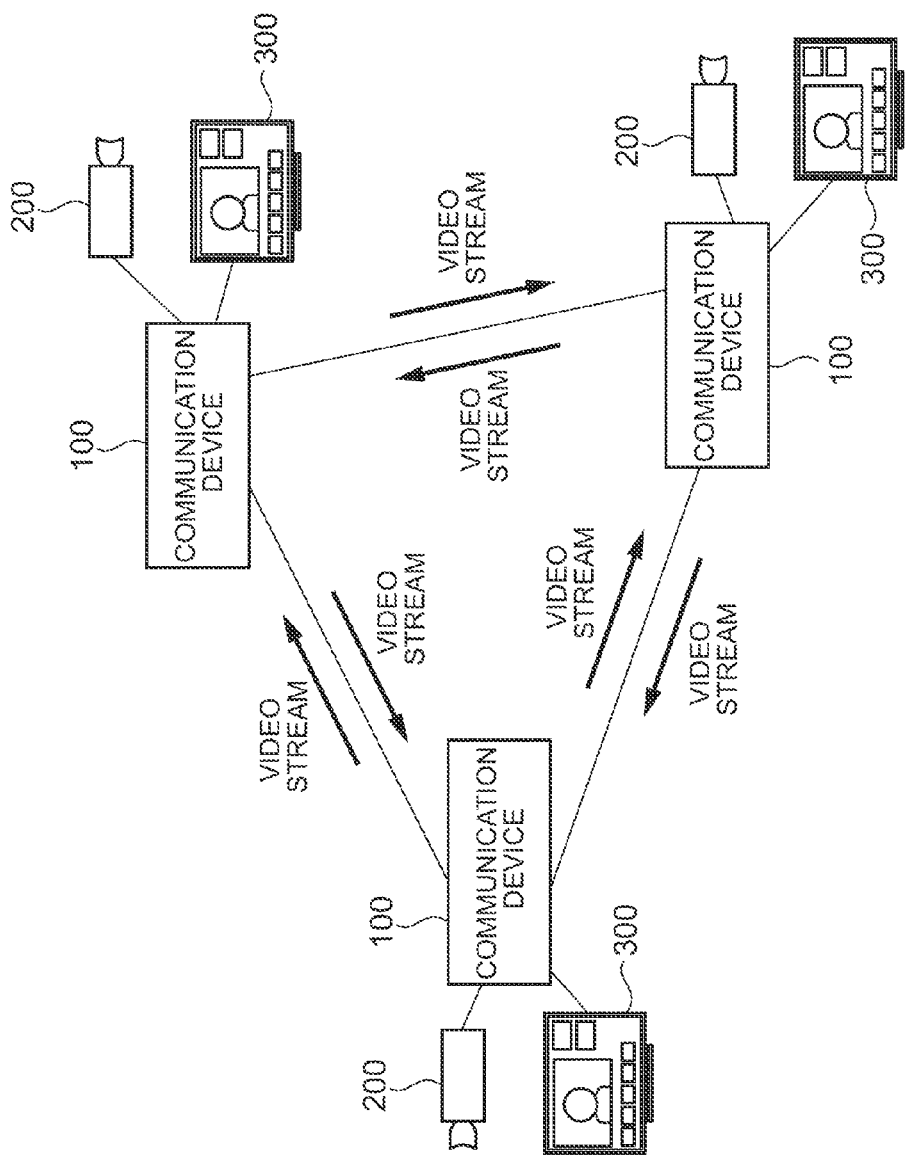
FIG. 1 is a diagram showing an example of a system structure according to an aspect of the present disclosure.

An example of a system structure according to an aspect of the present disclosure is described first, with reference to FIG. 1. FIG. 1 is a diagram showing an example of a system structure according to an aspect of the present disclosure.

As shown in FIG. 1, a communication device 100 is placed in each location (each point). Each communication device 100 is capable of communicating with the other communication devices 100 via an arbitrary communication medium. Moreover, for example, a camera (imaging device) 200 and a monitor (display device) 300 are connected to each communication device 100, and the communication device 100 is capable of transmitting video captured by the camera 200 to the other communication devices 100 and displaying video received from the other communication devices 100 on the monitor 300.

Though the following description concerns, as an aspect of the present disclosure, the case where each communication device 100 mainly transmits video captured in the communication device 100 to the other communication devices, for example a microphone (sound collection device) and a speaker (audio output device) may be connected to each communication device 100 so that audio can be transmitted and received together with video.

Video captured in each communication device 100 is continuously transmitted to the other communication devices 100 by streaming, and received and reproduced (displayed on the monitor 300) by the communication devices 100 receiving the video. Hence, in this specification, video transmitted from each communication device to the other communication devices is also referred to as "video stream". Further, in this specification, an image obtained by performing a process of clipping an image from video (a process of acquiring an image from video, or a process of generating a still image from a series of video frames such as capturing) is also referred to as "snap image", and content included in a snap image as "image content".

Though the system structure in which three communication devices 100 each transmit and receive a video stream is shown in FIG. 1, the number of communication devices 100 may be two, or four or more. A structure in which video in a specific location is distributed to multiple locations by a network topology such as a tree structure or a mesh structure, or a network structure via a device (which may be included in a communication device 100) including a multipoint control unit is also available.

Though the following describes the case where each communication device 100 basically transmits video to all of the other communication devices 100, each communication device 100 may transmit video to only one specific communication device 100 or a plurality of specific communication devices 100. Moreover, though the following describes the case where each communication device 100 performs bidirectional communication (video transmission and reception), one or more communication devices 100 that perform only video transmission without performing video reception (the monitor 300 need not be connected to such communication device 100) and/or one or more communication devices 100 that perform only video reception without performing video transmission (the camera 200 need not be connected to such communication device 100) may be included.

Furthermore, one communication device 100 may transmit a plurality of video streams. For instance, a plurality of cameras 200 may be connected to one communication device, with video captured by each of the plurality of cameras 200 being transmitted to the other communication devices 100. An example of an assumed situation is that communication devices 100 placed in different locations are used to conduct a conference connecting each location, where a camera 200 for capturing persons and a camera 200 for capturing materials are connected to each communication device 100 and video captured by the camera 200 for capturing persons and video captured by the camera 200 for capturing materials are transmitted to the other communication devices 100. A personal computer or any other video reproduction device may be connected as a video transmission source (video source) instead of the camera 200.

Hereafter, regarding transmission information (e.g. video or below-mentioned instruction information) transmitted from one of the plurality of communication devices 100, the communication device 100 transmitting the transmission information is also referred to as "transmitter", and the communication device 100 receiving the transmission information as "receiver". As is clear from the structure in which each communication device 100 is capable of transmitting and receiving a video stream, a communication device 100 can be a transmitter for some transmission information (e.g. one video stream) and a receiver for other transmission information (e.g. another video stream).

(Structure of Communication Device)

Figure 2:
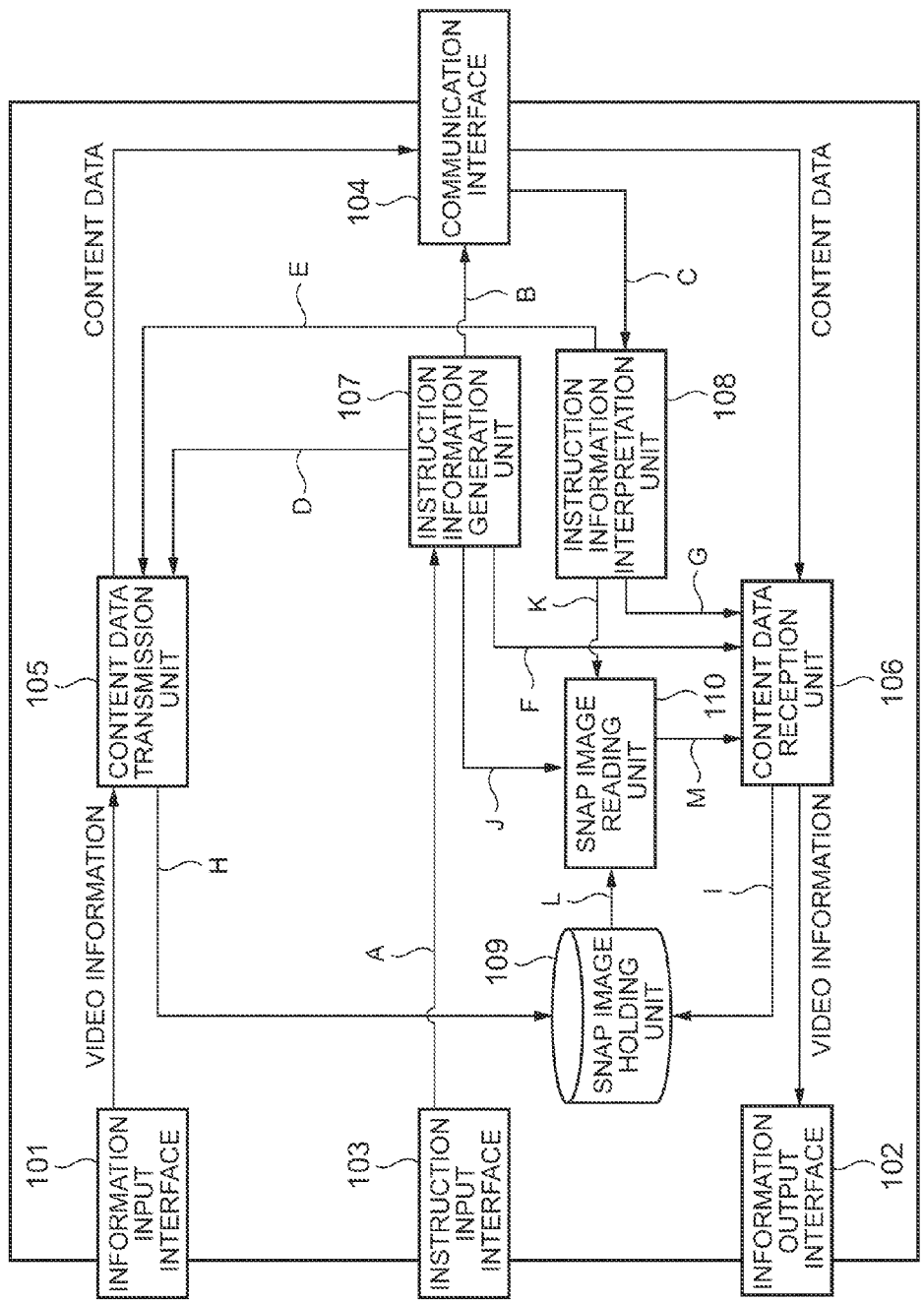
FIG. 2 is a block diagram showing an example of a structure of a communication device 100 according to an aspect of the present disclosure.

The following describes an example of a structure of a communication device 100 according to an aspect of the present disclosure. FIG. 2 is a block diagram showing an example of a structure of a communication device 100 according to an aspect of the present disclosure.

The communication device 100 shown in FIG. 2 includes, for example, an information input interface 101, an information output interface 102, an instruction input interface 103, a communication interface 104, a content data transmission unit 105, a content data reception unit 106, an instruction information generation unit 107, an instruction information interpretation unit 108, a snap image holding unit 109, and a snap image reading unit 110.

The information input interface 101 is an interface for reading information to be transmitted to the other communication devices 100. For example, the information input interface 101 is connectable to the camera 200 or any other video reproduction device, and is capable of reading video information into the communication device 100. The information input interface 101 may be connected to a microphone (sound collection device) or the like, and read audio information into the communication device 100. One or more cameras 200 or other video reproduction devices may be connected to the information input interface 101, to enable a plurality of sets of video information to be read. The information input interface 101 is connected so that the video information read via the information input interface 101 is supplied to the content data transmission unit 105.

The information output interface 102 is an interface for outputting information received from any of the other communication devices 100. For example, the information output interface 102 is connectable to a display device such as the monitor 300, and is capable of outputting video information to outside the communication device 100. The information output interface 102 may be connected to a speaker (audio output device) or the like, and output audio information to outside the communication device 100. One or more monitors 300 or other video display devices may be connected to the information output interface 102, to enable a plurality of sets of video information to be displayed on different devices.

The instruction input interface 103 is a user interface for receiving an instruction from a user through a user input in the communication device 100. For example, the instruction user interface 103 is connectable to a remote control (remote controller), a mouse, a keyboard, a touch panel, or the like, and is capable of receiving an instruction from the user using such a user interface device in the communication device 100. The instruction input interface 103 is connected so that a signal (user instruction signal) relating to the user instruction received via the instruction input interface 103 is supplied to the instruction information generation unit 107.

The above-mentioned information input interface 101, information output interface 102, and instruction input interface 103 may be provided not as external interfaces but as internal interfaces. In the case of providing these interfaces as internal interfaces, for example, devices such as the camera 200, the monitor 300, the speaker, the operation switch, and the like are included as part of the communication device 100 and connected to the internal interfaces.

The communication interface 104 is an interface that enables connection to a network used for the communication device 100 to communicate with the other locations, such as Ethernet®, a wireless LAN (Local Area Network), or a public wireless network (cellular system) for mobile lines and the like. The network may be wired or wireless. The communication interface 104 (especially in the case of wireless) may also be not included in the communication device 100 as a physical interface, by inclusion of a device.

The content data transmission unit 105 and the content data reception unit 106 have respective functions of transmitting and receiving content data. The content data transmission unit 105 is capable of converting information (e.g. video information) supplied from the information input interface 101 into a form of content data transferred via a communication path, and transmitting the content data via the communication interface 104. The content data reception unit 106 is capable of restoring and processing content data received via the communication interface 104 into information (e.g. video information) presented to the user, and outputting the information from the information output interface 102.

The content data transmission unit 105 and the content data reception unit 106 also have a function of transmitting and receiving content data as the communication device 100 for bidirectional communication, by performing processes (e.g. coding/decoding, data packetization/de-packetization, error correction, retransmission, communication control, etc.) necessary for transferring content data. The content data transmission unit 105 and the content data reception unit 106 further have a function of performing a process (capturing) of clipping an image from video being transmitted or received. The content data reception unit 106 may synthesize a plurality of video streams (content data), snap images supplied from the snap image reading unit 110, and the like, when generating video information to be displayed on the display device such as the monitor 300.

A receive-only communication device 100 that performs only content data reception without performing content data transmission does not necessarily need to include the content data transmission unit 105. A transmit-only communication device 100 that performs only content data transmission without performing content data reception does not necessarily need to include the content data reception unit 106. Content data transmitted from the content data transmission unit 105 may also be supplied to the content data reception unit 106 so that video being transmitted from the communication device 100 is displayed on the monitor 300 via the information output interface 102.

The instruction information generation unit 107 has functions of: generating instruction information based on a user instruction signal from the instruction input interface 103 and transmitting the instruction information to the other communication devices 100 via the communication interface 104; instructing, in the case where the user instruction is an image storage instruction, the content data transmission unit 105 or the content data reception unit 106 to clip an image from content data being transmitted or received to acquire a snap image and store the snap image; and instructing, in the case where the user instruction is an image display instruction, the snap image reading unit 110 to read a predetermined snap image from the snap image holding unit 109.

The instruction information interpretation unit 108 has functions of: interpreting instruction information received via the communication interface 104; instructing, in the case where the instruction information is an image storage instruction, the content data transmission unit 105 or the content data reception unit 106 to clip an image from video being transmitted or received to acquire a snap image and store the snap image; and instructing, in the case where the instruction information is an image display instruction, the snap image reading unit 110 to read a predetermined snap image from the snap image holding unit 109.

Note that, depending on the application, the communication device 100 may be configured to receive only an instruction input by the user without receiving instruction information transmitted from the other communication devices 100 (i.e. configured to have only a function of transmitting instruction information to the other communication devices 100). Alternatively, the communication device 100 may be configured to receive only instruction information transmitted from the other communication devices 100 without receiving an instruction input by the user (i.e. configured to have only a function of receiving instruction information from the other communication devices 100). The communication device 100 configured not to receive instruction information transmitted from the other communication devices 100 does not necessarily need to include the instruction information interpretation unit 108. The communication device 100 configured not to receive an instruction input by the user does not necessarily need to include the instruction information generation unit 107.

The snap image holding unit 109 has a function of holding each snap image clipped from video by the content data transmission unit 105 or the content data reception unit 106.

The snap image reading unit 110 has a function of reading a designated snap image based on an instruction from the instruction information generation unit 107 or the instruction information interpretation unit 108 and passing the snap image to the content data reception unit 106 so that the snap image is output from the information output interface 102 (e.g. displayed on the monitor 300).

The communication device 100 may further have functions such as: a function of stabilizing communication for video being transmitted by the content data transmission unit 105 or the video (changeable to a mode for stabilizing video); a function of detecting stability of communication for video being received by the content data reception unit 106 and, in the case where a predetermined stability criterion is satisfied, executing a snap image clipping process (changeable to the mode for stabilizing video); a function of blocking a new image storage instruction during the snap image clipping process and the storage; a function of managing information for specifying a snap image and identifying the snap image by the information for specifying the snap image; a function of generating information for specifying a snap image and notifying the information to the other communication devices 100; and a function of defining a snap image clipping timing and notifying the timing to the other communication devices 100.

Transfer paths for transmitting and receiving signals or data between the blocks in the communication device 100 shown in FIG. 2 are the following, as an example.

A path A indicates that a user instruction signal output from the instruction input interface 103 based on a user input is supplied to the instruction information generation unit 107. According to an aspect of the present disclosure, a user instruction input by the user is, for example, an image storage instruction to store an image or an image display instruction to display an image.

A path B indicates that instruction information generated by the instruction information generation unit 107 based on the user instruction signal is transmitted to the other communication devices 100 via the communication interface 104. A path C indicates that instruction information received from any of the other communication devices 100 via the communication interface 104 is supplied to the instruction information interpretation unit 108.

A path D indicates an image storage instruction issued from the instruction information generation unit 107 to the content data transmission unit 105 in the case where the user instruction signal (path A) is an image storage instruction and the communication device 100 is transmitting video that is subject to image storage.

A path E indicates an image storage instruction issued from the instruction information interpretation unit 108 to the content data transmission unit 105 in the case where the instruction information (path C) received from any of the other communication devices 100 is an image storage instruction and the communication device 100 is transmitting video that is subject to image storage.

A path F indicates an image storage instruction issued from the instruction information generation unit 107 to the content data reception unit 106 in the case where the user instruction signal (path A) is an image storage instruction and video that is subject to image storage is being received from any of the other communication devices 100.

A path G indicates an image storage instruction issued from the instruction information interpretation unit 108 to the content data reception unit 106 in the case where the instruction information (path C) received from any of the other communication devices 100 is an image storage instruction and video that is subject to image storage is being received from any of the other communication devices 100.

A path H indicates that the content data transmission unit 105 clips a snap image from video being transmitted by the communication device 100 and stores the snap image in the snap image holding unit 109. A path I indicates that the content data reception unit 106 clips a snap image from video being received by the communication device 100 and stores the snap image in the snap image holding unit 109.

A path J indicates an image display instruction issued from the instruction information generation unit 107 to the snap image reading unit 110 in the case where the user instruction signal (path A) is an image display instruction.

A path K indicates an image display instruction issued from the instruction information interpretation unit 108 to the snap image reading unit 110 in the case where the instruction information (path C) received from any of the other communication devices 100 is an image display instruction.

Paths L and M indicate that the snap image reading unit 110, upon receiving an image display instruction from the instruction information generation unit 107 or the instruction information interpretation unit 108, reads a specific snap image from the snap images held in the snap image holding unit 109 (path L) and supplies the snap image to the content data reception unit 106 (path M).

Note that the functional blocks shown in FIG. 2 or the processing units having the same functions as these functional blocks may be realized by hardware, software, or a combination of hardware and software. As an example, the functional blocks included in each device shown in FIG. 2 or the processing units having the same functions as these functional blocks may be realized by hardware such as a CPU and a memory in an arbitrary computer. As another example, the functional blocks shown in FIG. 2 or the processing units may be realized by a computer executing a program in which operations related to these functions are written.

In particular, the generation and transmission of the instruction information by the instruction information generation unit 107, the interpretation of the instruction information by the instruction information interpretation unit 108, the image storage instruction from the instruction information generation unit 107 or the instruction information interpretation unit 108 to the content data transmission unit 105 or the content data reception unit 106, the image display instruction from the instruction information generation unit 107 or the instruction information interpretation unit 108 to the snap image reading unit 110, the storage of the snap image in the snap image holding unit 109 by the content data transmission unit 105 or the content data reception unit 106, the reading of the snap image by the snap image reading unit 110, and the like can be realized by a computer executing a predetermined program. The snap image holding unit 109 can be realized by a recording medium for storing information.

(Basic Image Storage Operation)

The following describes an example of a basic image storage operation according to an aspect of the present disclosure. According to an aspect of the present disclosure, in the case where an image storage instruction is input to an arbitrary communication device 100 by a user, the process of clipping a snap image from video and the storage of the snap image are performed in the plurality of communication devices 100 including the communication device 100. This allows the same image content to be shared in real time, while reducing traffic between the communication devices 100. For example, it is possible to share a material during a conference in real time, and expedite the proceedings by referring to the image of the material shared between the attendees of the conference. Regarding a material that is referred to a plurality of times during the conference and is likely to be subject to discussion in the conference, the image of the material is desirably higher in resolution than normal video (e.g. video showing the attendees). According to an aspect of the present disclosure, the shared image (e.g. the image of the material) of high resolution can be obtained.

The following describes processes executed by a communication device 100 (hereafter referred to as "transmitter communication device 100A") transmitting video and communication devices 100 (hereafter referred to as "receiver communication devices 100B and 1000") receiving the video in a system including three communication devices 100 (e.g. the system shown in FIG. 1), as an example. In detail, the case where a user inputs an image storage instruction to the video receiver (FIG. 3) and the case where a user inputs an image storage instruction to the video transmitter (FIG. 4) are each described below.

Figure 3:
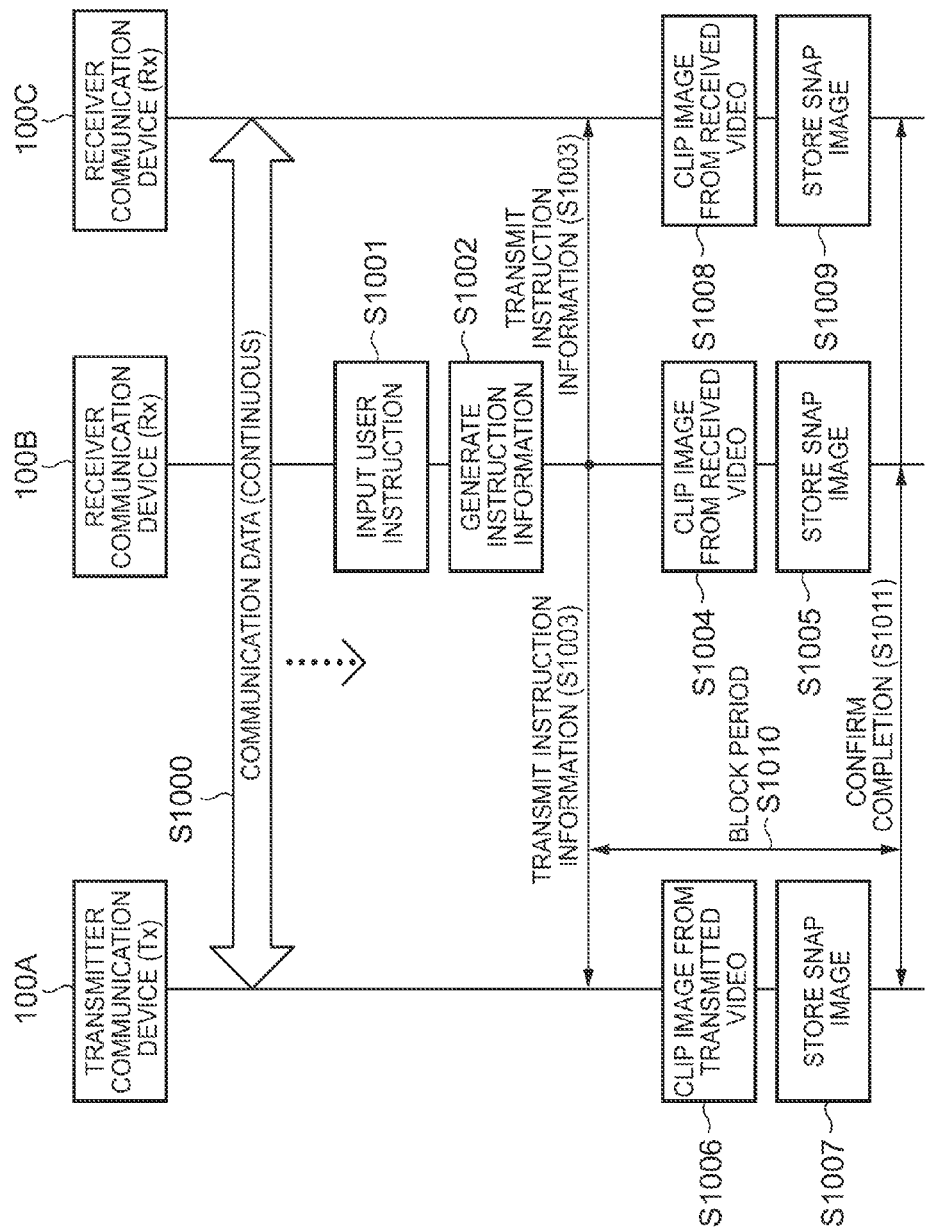
FIG. 3 is a sequence chart showing an example of an image storage operation in the case where a user inputs an image storage instruction to a video receiver according to an aspect of the present disclosure.

FIG. 3 is a sequence chart showing an example of an image storage operation in the case where a user inputs an image storage instruction to the video receiver according to an aspect of the present disclosure.

In FIG. 3, a state where content data including at least video information is continuously transmitted and received between the plurality of communication devices 100 is presumed (step S1000). For example, it is assumed that communication (e.g. a conference) is being performed by connecting all communication devices 100 placed in the respective locations, and at least the transmitter communication device 100A is transmitting a video stream to the receiver communication devices 100B and 100C.

In the above-mentioned state where content data is being transmitted and received between the plurality of communication devices 100, suppose, in one of the communication devices 100 (e.g. the receiver communication device 100B) receiving the video, a user inputs an image storage instruction to store an image from the video which the receiver communication device 100B is receiving from the transmitter communication device 100A (step S1001). The receiver communication device 100B generates instruction information including the image storage instruction to store the image from the corresponding video stream, in the instruction information generation unit 107 (step S1002).

This instruction information may include information with which the video or the transmitter communication device 100A transmitting the video can be specified, such as the identifier of the transmitter communication device 100A transmitting the video, the address for specifying the transmitter communication device 100A on the network, the information (e.g. place name, room name, floor name) for identifying the location in which the transmitter communication device 100A is placed, or the identifier of the video stream corresponding to the video. Especially in the case where a plurality of video streams are being transmitted from the transmitter communication device 100A, the identifier for identifying the video stream corresponding to the video may be included in the instruction information in order to identify the specific video stream from among the plurality of video streams.

The receiver communication device 100B transmits the instruction information generated in step S1002 to the other communication devices 100 (the transmitter communication device 100A and the receiver communication device 100C that is receiving the video as with the receiver communication device 100B), as the image storage instruction for the video (step S1003). The instruction information transmission method is arbitrary, and the receiver communication device 100B may transmit the instruction information to the transmitter communication device 100A and the receiver communication device 100C by unicast, multicast, broadcast, or the like.

Simultaneously with the generation and transmission of the instruction information in steps S1002 and S1003, the receiver communication device 100B also starts the process of clipping the image from the video and storing the image in the receiver communication device 100B, based on the image storage instruction input by the user in step S1001. The receiver communication device 100B clips the image from the received video in the content data reception unit 106 (step S1004), and stores the clipped snap image in the snap image holding unit 109 (step S1005).

Meanwhile, upon receiving the instruction information from the receiver communication device 100B, the other communication devices 100 (the transmitter communication device 100A and the receiver communication device 100C) each start the process of clipping the image from the video and storing the image based on the received instruction information.

The transmitter communication device 100A specifies the video based on the received instruction information in the instruction information interpretation unit 108, clips the image from the video in the content data transmission unit 105 (step S1006), and stores the clipped snap image in the snap image holding unit 109 (step S1007). The receiver communication device 100C specifies the video based on the received instruction information in the instruction information interpretation unit 108, clips the image from the video in the content data reception unit 106 (step S1008), and stores the clipped snap image in the snap image holding unit 109 (step S1009).

Figure 4:
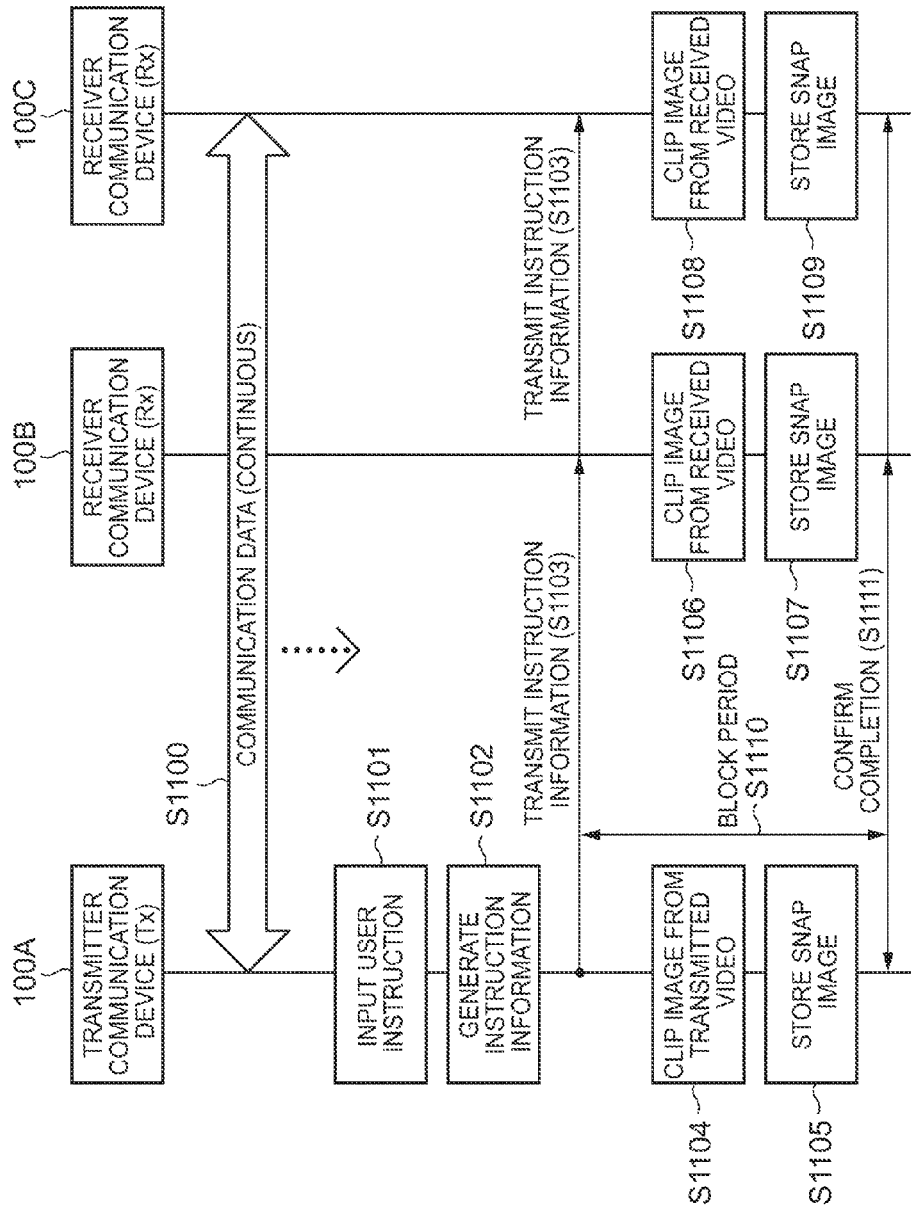
FIG. 4 is a sequence chart showing an example of an image storage operation in the case where a user inputs an image storage instruction to a video transmitter according to an aspect of the present disclosure.

FIG. 4 is a sequence chart showing an example of an image storage operation in the case where a user inputs an image storage instruction to the video transmitter according to an aspect of the present disclosure.

In FIG. 4, a state where content data including at least video information is continuously transmitted and received between the plurality of communication devices 100 is presumed (step S1100), as in FIG. 3. In the state where content data is being transmitted and received between the plurality of communication devices 100, suppose, in the communication device 100 (the transmitter communication device 100A) transmitting the video, a user inputs an image storage instruction to store an image from the video which the transmitter communication device 100A is transmitting to the other communication devices 100 (the receiver communication devices 100B and 100C) (step S1101). The transmitter communication device 100A generates instruction information including the image storage instruction to store the image from the corresponding video stream, in the instruction information generation unit 107 (step S1102).

This instruction information may include information with which the video or the transmitter communication device 100A transmitting the video can be specified, such as the identifier of the transmitter communication device 100A transmitting the video, the address for specifying the transmitter communication device 100A on the network, the information (e.g. place name, room name, floor name) for identifying the location in which the transmitter communication device 100A is placed, or the identifier of the video stream corresponding to the video. Especially in the case where a plurality of video streams are being transmitted from the transmitter communication device 100A, the identifier for identifying the video stream corresponding to the video may be included in the instruction information in order to identify the specific video stream from among the plurality of video streams.

The transmitter communication device 100A transmits the instruction information generated in step S1102 to the other communication devices 100 (the receiver communication devices 100B and 100C receiving the video), as the image storage instruction for the video (step S1103). The instruction information transmission method is arbitrary, and the communication device 100B may transmit the instruction information to the communication devices 100B and 100C by unicast, multicast, broadcast, or the like. The transmitter communication device 100A may insert the instruction information as additional information of the video stream being transmitted.

Simultaneously with the generation and transmission of the instruction information in steps S1102 and S1103, the transmitter communication device 100A also starts the process of clipping the image from the video and storing the image in the transmitter communication device 100A, based on the image storage instruction input by the user in step S1101. The transmitter communication device 100A clips the image from the transmitted video in the content data transmission unit 105 (step S1104), and stores the clipped snap image in the snap image holding unit 109 (step S1105).

Meanwhile, upon receiving the instruction information from the transmitter communication device 100A, the other communication devices 100 (the receiver communication devices 100B and 100C) each start the process of clipping the image from the video and storing the image based on the received instruction information.

The receiver communication devices 100B and 100C each specify the video based on the received instruction information in the instruction information interpretation unit 108, clip the image from the video in the content data reception unit 106 (steps S1106 and S1108), and store the clipped snap image in the snap image holding unit 109 (steps S1107 and S1109).

As described above, in the case where an image storage instruction to clip an image from video and store the image is input to any of the plurality of communication devices 100 by a user, the process of clipping the image from the video and storing the clipped image as a snap image is performed in all communication devices 100 transmitting or receiving the video. As a result, the snap image including the same image content is stored in the snap image holding unit 109 in each of all communication devices 100 transmitting or receiving the video. Thus, the same image content can be shared by the plurality of communication devices 100 in real time.

Though there is a possibility that the snap image clipped in each of the plurality of communication devices 100 is not an image clipped at the same timing, the snap image is at least an image clipped from video captured within a predetermined period from a certain point in time (when the image storage instruction is input by the user), and so is an image including the same image content. For example in the case where a conference is being held by connecting different locations using the communication devices 100 placed in the respective locations while capturing a predetermined material, a snap image (i.e. an image obtained by capturing the predetermined material) including the same image content can be stored in each communication device 100 according to an aspect of the present disclosure.

Though the snap image including the same image content is stored in all communication devices 100 included in the system in the operations shown in FIGS. 3 and 4, for example the snap image may be stored in one specific communication device 100 or a plurality of specific communication devices 100 (communication device(s) 100 belonging to a specific group). This can be achieved, for example, by transmitting the instruction information only to the communication device(s) 100 belonging to the specific group or by each communication device 100 not belonging to the specific group ignoring the instruction information.

(Block Period)

When executing the image storage process based on the image storage instruction by the user input or the instruction information, each communication device 100 may interrupt (block) other similar instructions. For instance, in the case of starting the image clipping process based on the image storage instruction by the user input or the instruction information, the instruction information generation unit 107 or the instruction information interpretation unit 108 in the communication device 100 may, even if a new instruction relating to image storage is received during the image clipping process, ignore the new instruction. Here, a user input for instructing to store an image may be disabled, for example, by deactivating (making unclickable) an image storage instruction input button in a GUI (Graphical User Interface). In this way, even when an image storage instruction to clip an image from video and store the image is input in a plurality of locations (a plurality of communication devices 100) substantially simultaneously, only the earliest instruction is valid, and so the image including the same image content can be kept from being repeatedly stored.

When blocking a new instruction during the image clipping process, only a new image storage instruction for the video in the image storage process may be blocked, without blocking an instruction for video different from the video in the image storage process. As an alternative, not only a new image storage instruction for the video in the image storage process but also a new instruction for video different from the video in the image storage process (i.e. all new image storage instructions) may be blocked. This can be achieved, for example, by identifying video in each of a plurality of locations or video of each of a plurality of cameras, personal computers, or other video reproduction devices so that the video can be specified.

A period (block period) during which other similar instructions are interrupted may be, for example, a predetermined period (e.g. several seconds) set beforehand, a period until the image storage process is completed in the communication device 100, or a period until the completion of the image storage process in the other communication devices 100 is also confirmed.

The flowcharts in FIGS. 3 and 4 show an example where a period until the completion of the image storage process in all of the communication devices 100A to 100C is confirmed is set as the block period in each of the communication devices 100A to 100C (step S1010 in FIG. 3 or step S1110 in FIG. 4).

In this case, for instance, each communication device 100 may notify the completion of the image storage process to the other communication devices 100 when the communication device 100 completes the image storage process (step S1011 in FIG. 3 or step S1111 in FIG. 4) and, in the case where the completion of the image storage process in all communication devices 100 is confirmed, remove the blocking of new image storage instructions.

The process of confirming the completion of the image storage process in all communication devices 100 can be realized by an arbitrary method. As an example, upon completing the image storage process, each communication device 100 may transmit the completion notification to the other communication devices 100 as mentioned above. This enables the completion notification to be transmitted and received between the communication devices 100, as a result of which it is possible to confirm the completion of the image storage process in all communication devices 100. As another example, upon completing the image storage process, each communication device 100 may transmit the completion notification to a predetermined communication device 100 (e.g. the communication device 100 transmitting the instruction information, the communication device 100 transmitting the video, or a communication device 100 set beforehand). The predetermined communication device may then recognize the state of each communication device 100 and, in the case where the completion of the image storage process in all communication devices 100 is confirmed, transmit information indicating the end of the block period to all communication devices 100.

Each communication device 100 may remove the block period when a predetermined period has elapsed, even in the case where the completion of the image storage process in at least one communication device 100 cannot be confirmed. When the image storage process fails in at least one communication device 100, the communication device 100 may reacquire the image by some method (see the below-mentioned "process when image discrepancy occurs").

During the block period, feedback may be provided to the user, for example, by notifying that the image storage process is in progress or displaying that a user input for a new image storage instruction is blocked. In this case, each communication device 100 may be set to automatically provide feedback to the user during the block process, or set to provide feedback in the case where the communication device 100 transmitting the instruction information issues a request to provide feedback to each user together with the instruction information.

(Assignment of Information for Specifying Snap Image)

Each communication device 100 may assign, to the stored snap image, information for specifying the snap image, thus managing the snap image. The information for specifying the snap image is snap image identification information managed in association with the snap image stored in each communication device 100.

In particular, since all communication devices 100 basically store the snap image including the same image content based on the same image storage instruction (image storage input by one user), it is effective to assign common information (hereafter referred to as "common ID") for specifying the snap image to the snap image including the same image content stored in each communication device 100. The common ID is effective information for specifying that the snap image stored in each communication device 100 is the snap image generated based on the same image storage instruction.

The assignment of the above-mentioned common ID (the generation of the common ID and the notification of the common ID to each communication device 100) can be performed by an arbitrary communication device 100, a separately provided ID management device, or the like. The common ID assignment timing is not particularly limited, as long as the common ID is eventually assigned to the snap image including the same image content stored in each communication device 100 so that, for example upon image display, the snap image including the same image content can be displayed on each communication device 100 by designating the common ID. For instance, the ID may be assigned in the completion confirmation process in step S1011 in FIG. 3 or step S1111 in FIG. 4.

The following describes the case where the common ID is assigned by any of: the communication device 100 to which the image storage instruction is input by the user; the communication device 100 transmitting the video; and the ID management device authorized to perform ID assignment (one of the communication devices 100 or a separately provided ID management device).

As an example, the common ID may be assigned by the communication device 100 to which the image storage instruction is input by the user (i.e. the communication device 100 transmitting the instruction information). In the example in FIG. 3, the receiver communication device 100B is authorized to assign the common ID. In the example in FIG. 4, the transmitter communication device 100A is authorized to assign the common ID. Though the common ID may be assigned at an arbitrary timing as mentioned above, for example, efficient common ID assignment is possible by assigning the common ID simultaneously with the transmission of the instruction information (step S1003 in FIG. 3 or step S1103 in FIG. 4). In such a case, for example, the communication device 100 transmitting the instruction information generates, upon storing the image, the common ID to be assigned and transmits the common ID to the other communication devices 100 together with the instruction information. This enables all communication devices 100 to recognize the common ID and associate the common ID with the snap image clipped based on the instruction information.

As another example, the ID may be assigned by the communication device transmitting the video that is subject to image storage. In the examples in FIGS. 3 and 4, the transmitter communication device 100A is authorized to assign the common ID. Though the common ID may be assigned at an arbitrary timing as mentioned above, for example in the case where the communication device 100 transmitting the video that is subject to image storage also has a function of defining and notifying the timing of clipping the image from the video, efficient common ID assignment is possible by assigning the common ID simultaneously with the transmission of the timing information of clipping the image from the video (the information indicating the timing of clipping the image from the video may be used as the common ID). In addition, the time discrepancy in image storage between the communication devices 100 can be reduced and the image can be stored in a state where the video is stabilized (see the below-mentioned "video stabilization" and "suppression of image discrepancy in each communication device").

As yet another example, the ID management device authorized to assign the common ID may be set in the system to assign the common ID. The ID management device may be a predetermined communication device 100 set to perform common ID assignment every time, or a communication device different from the communication devices 100. In this case, too, the common ID may be assigned at an arbitrary timing. In the case where a communication device different from the communication devices 100 is provided with the function as the ID management device, for example, the instruction information transmitted and received between the communication devices 100 may also be delivered to the ID management device so that the ID management device can detect the instruction information transmitted and received between the communication devices 100.

Even in the case where, instead of notifying the common ID from the arbitrary communication device 100 or the ID management device to all communication devices 100 as mentioned above, each communication device 100 individually assigns an ID (hereafter referred to as "local ID") to the stored snap image, by setting a predetermined rule for the local ID to be assigned, it is possible for each management device 100 to manage the snap image including the same image content by the same local ID. As an example, each communication device 100 may use serial numbers (in ascending order) starting from a predetermined number, as local IDs for managing sequentially stored snap images. In this case, each communication device 100 may assign common local IDs such as "0001" to the snap image stored first and "0002" to the snap image stored second, to manage the snap images.

Each communication device 100 may also perform snap image management by generating a local ID including, for instance, time information at which the snap image is stored. In this case, there is a possibility that the time information used as the local ID in each communication device 100 is not the same in all communication devices 100. However, given that the snap image is stored in each communication device 100 within a predetermined period from when the image storage instruction is input, the snap image managed in each communication device 100 by the local ID including the time information within a certain time range can be regarded as the snap image including the same image content.

(Video Stabilization)

Upon storing the image, the communication device 100 transmitting the video may stabilize the video, or the communication device 100 receiving the video may confirm the stabilization of the video before storing the image. The video stabilization allows each communication device 100 to store a high-quality image (e.g. high-definition image with high image resolution), and also to store an image without discrepancy (i.e. the snap image including the same image content).

The video stabilization mentioned here is an operation of suppressing situations where the video is disturbed or the video acquisition time differs depending on location due to abrupt variations in communication traffic and the like.

For instance, the communication device 100 transmitting the video may shift to the mode for stabilizing video upon receiving the image storage instruction by the user input or the instruction information, and suppress switching the video or significantly changing movement in the video for a predetermined period (e.g. until the above-mentioned block period ends), thus reducing the discrepancy of the image to be stored (the discrepancy of the frame to be stored).

The mode for stabilizing video may further include prioritizing the image resolution of the image or enhancing the process of error correction or data retransmission (e.g. increasing the amount of information, providing a sufficient allowable time) (the communication stabilization by this process leads to the video stabilization). Moreover, the video stream of the video may be fixed (semi-fixed) so that the video is unchanged or little changed for a period of a plurality of frames in the video stream. For instance, the communication device 100 transmitting the video may use, for the video that is subject to image storage, only intra-frame information coding (intra-frame coding) when coding the video during the block period.

The communication device 100 transmitting the video may, for instance, explicitly notify the shift to the mode for stabilizing video, to each communication device 100 receiving the video. For example in the case where the communication device 100 transmitting the video transmits the instruction information or assigns the common ID, the communication device 100 transmitting the video may notify the shift to the mode for stabilizing video, simultaneously with the transmission of the instruction information or the assignment of the common ID. Moreover, the communication device 100 transmitting the video may shift to the mode for stabilizing video, when requested by the communication device 100 receiving the video to shift to the mode for stabilizing video.

The communication device 100 receiving the video may, for example, wait for the stabilization of the video before performing the snap image clipping process. For instance, the communication device 100 receiving the video may perform the image clipping and storage when the recovery (error tolerance) of the received video is completed to at least a predetermined standard as a result of error correction, retransmission control, and the like. The communication device 100 receiving the video may also explicitly request the communication device 100 transmitting the video to shift to the mode for stabilizing video. For example in the case where the communication device 100 receiving the video transmits the instruction information or assigns the common ID, the communication device 100 receiving the video may request the communication device 100 transmitting the video to shift to the mode for stabilizing video, simultaneously with the transmission of the instruction information or the assignment of the common ID.

(Suppression of Image Discrepancy in Each Communication Device)

Since each communication device 100 individually clips the snap image from the video, there is a possibility that factors such as communication delay time and processing delay time cause a discrepancy in the time at which the snap image is stored in each communication device 100 (in particular, a discrepancy (difference) between the time at which the image is stored in the communication device 100 to which the image storage instruction is input and the time at which the image is stored in the communication device 100 receiving the instruction information) or a discrepancy (difference) in the quality (e.g. image resolution) of the image stored in each location. In a situation where a sufficient communication band is secured, the time required for necessary information transfer is short, and the possibility of such a time or quality discrepancy of the image is small. When the communication band decreases or the number of data errors on the communication path increases, however, the transfer of the content data takes time and the quality of the content data degrades due to transfer, so that the difference of the image content included in the image clipped in each communication device 100 tends to increase.

In view of the possibility of the occurrence of such circumstances, a mechanism for enabling all communication devices 100 to store images without a large discrepancy may be provided. For example, stabilizing the communication or the video as mentioned above is effective as such a mechanism. When storing the image in each location, the communication device 100 transmitting the video shifts to the mode for stabilizing video, as a result of which the video with stable quality or the video without a significant change (discrepancy) according to time can be provided to the other communication devices 100.

As the mechanism for enabling all communication devices 100 to store images without a large discrepancy, for example, the timing of clipping the image from the video may be defined. By defining the timing of clipping the image from the video, it is possible for each communication device 100 to store an image without a large time discrepancy (or an image with no discrepancy).

The timing of clipping the image from the video can be defined and notified by an arbitrary communication device, a separately provided timing information management device, or the like, as in the case of the above-mentioned common ID assignment. For example, the timing of clipping the image from the video may be defined and notified by the communication device to which the image storage instruction is input by the user, the communication device transmitting the video, or the timing information management device authorized to define the timing information (which can be realized by one of the communication devices or a separately provided communication device). The device for defining and notifying the timing of clipping the image from the video may be the same as the device for assigning the common ID.

The timing of clipping the image from the video may be defined and notified at an arbitrary timing before each communication device 100 performs the image clipping process (i.e. before the timing of clipping the image from the video). That is, though the timing information of clipping the image from the video needs to be notified before each communication device 100 performs the process of clipping the image from the video, the notification timing is not particularly limited so long as it is before the process of clipping the image from the video.

As the timing information of clipping the image from the video, the time at which the image is clipped from the video (common time in the system), the frame number or timestamp for specifying the frame in the video stream for acquiring the snap image to be stored, or other timing identifiable information included in the video stream may be used. For example, having notified of the timing information of clipping the image from the video, each communication device 100 (including the communication device 100 notifying the timing information) performs the image clipping process and the storage process based on the timing information. In the case where the time is specified as the timing information of clipping the image from the video, the discrepancy of the image stored in each communication device 100 can be limited to about the transmission delay time. The discrepancy can be further reduced, for example, by delaying the image clipping time in the communication device 100 receiving the video by the transmission delay time with respect to the image clipping time in the communication device 100 transmitting the video, or by taking the processing delay of video information decoding and the like into account.

In the case where the information for specifying the frame in the video stream is defined as the timing information of clipping the image from the video, each communication device 100 can clip the image from the same frame, so that the image with no time discrepancy is stored in each communication device 100.

Moreover, the communication device 100 transmitting the video may shift to the mode for stabilizing video according to the timing information of clipping the image from the video, as a result of which the video with stable quality can be provided to the other communication devices 100 at the image clipping timing.

In the case where the device for defining the timing information of clipping the image from the video is the same as the device for assigning the common ID, the timing information of clipping the image from the video or information including the timing information of clipping the image from the video may be used as the common ID to be assigned to the stored snap image (e.g. "(image name)+(frame number)", "(image name)+(acquisition timestamp)", or "hours:minutes:seconds" may be used as the common ID). This enables the assignment of the common ID and the notification of the timing information of clipping the image from the video to be performed simultaneously.

Especially in the case where the device for defining the timing information of clipping the image from the video is the same as the communication device 100 transmitting the video that is subject to image storage, it is easy to use the information for specifying the frame in the video stream as the common ID to be assigned to the stored image, and also selectively improve the quality (e.g. image resolution) of the frame (the frame identified by the information for specifying the frame). This ensures that the snap image including the same image content with high quality and with no time discrepancy is stored in the communication device 100 receiving the video. In the case where the device for defining the timing information of clipping the image from the video is the same as the communication device 100 transmitting the video that is subject to image storage, the timing information of clipping the image from the video may be notified together with the shift to the mode for stabilizing video, as an example.

(Process when Image Discrepancy Occurs)

A mechanism may be provided so that, in the case where at least one communication device 100 fails to store the snap image including the same image content such as: in the case where the communication device 100 stores an image with a large discrepancy (stores a snap image not including the same image content); in the case where the communication device 100 cannot receive the instruction information; or in the case where the communication device 100 cannot normally execute the image clipping process and so cannot store the snap image, the communication device 100 is allowed to perform an image reacquisition process.

For example, whether or not the image with the large discrepancy is stored may be visually determined by the user. Alternatively, it may be determined that the image with the large discrepancy is stored, in the case where the image is stored in a state where the communication is not sufficiently stable, in the case where at least a predetermined number of errors are detected on the communication path or during decoding, or in the case where the timing of clipping the image from the video is off (e.g. checking the frame number of the video stored as the snap image by completion confirmation or subsequent message exchange). In the case where the instruction information cannot be received (confirming that the snap image is stored in the other communication devices 100 by completion confirmation or subsequent arbitrary message exchange) or in the case where the image clipping process cannot be normally executed and as a result the storage of the image fails, it is possible to clearly determine from the absence of the stored image that the storage of the image including the same image content fails.

In the case where the storage of the image including the same image content fails, the failure of the image storage may be notified to the user of the communication device 100 failing to store the image or the user of the communication device 100 transmitting the instruction information, or the image reacquisition process may be executed automatically.

As the image reacquisition method, for example, the process of storing the image from the video may be performed again (i.e. performing the same process again), or the snap image may be acquired from another communication device 100 (e.g. the communication device 100 transmitting the video) that successfully stores the image.

In the case where it is expected before the execution of the image clipping process that, for example, the communication environment remains poor and the snap image including the same image content is unlikely to be successfully acquired, the communication device 100 may request another arbitrary communication device 100 beforehand to acquire the snap image for the communication device 100, and receive a copy of the snap image from the other arbitrary communication device 100.

(Screen Display of Snap Image)

Figure 5:
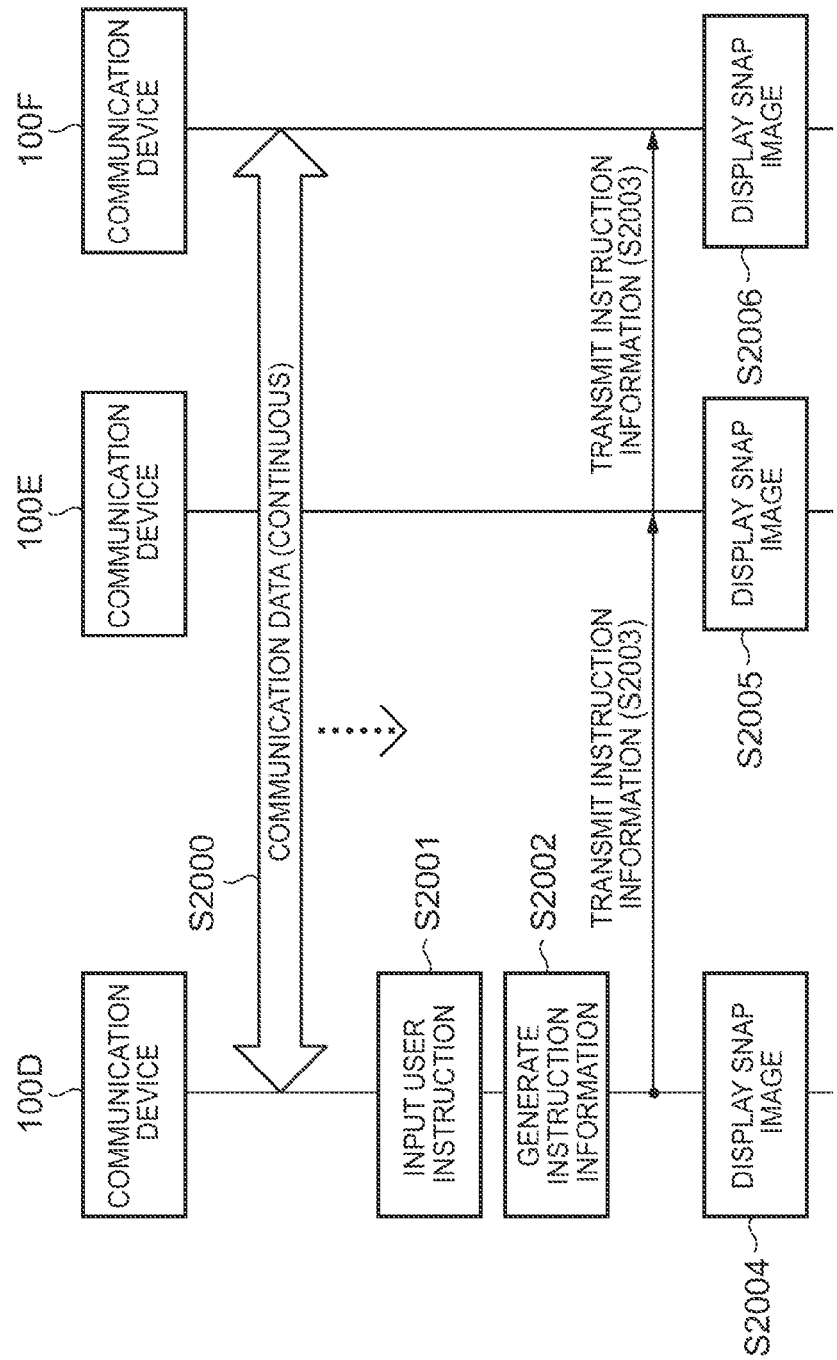
FIG. 5 is a sequence chart showing an example of an image display operation in the case where a user inputs an image display instruction according to an aspect of the present disclosure.

In the case of referring to the snap image again in an arbitrary communication device 100, the snap image including the same image content may be displayed in all communication devices 100. The following describes an example of an image display operation in the case where a user inputs an image display instruction according to an aspect of the present disclosure, with reference to FIG. 5. FIG. 5 is a sequence chart showing an example of an image display operation in the case where a user inputs an image display instruction according to an aspect of the present disclosure. FIG. 5 shows an example of processes executed by a communication device (hereafter referred to as "communication device 100D") to which an image display instruction is input by a user and the other communication devices (hereafter referred to as "communication devices 100E and 100F") in a system including three communication devices 100 (e.g. the system shown in FIG. 1).

In FIG. 5, a state where content data including at least video information is continuously transmitted and received between the plurality of communication devices 100 is presumed (step S2000), as in FIGS. 3 and 4. In the state where content data is being transmitted and received between the plurality of communication devices 100, suppose, in a communication device 100 (the transmitter communication device 100D), a snap image is selected and an image display instruction to display the snap image is input by the user (step S2001). The communication device 100D then generates instruction information including the image display instruction to display the selected snap image, in the instruction information generation unit 107 (step S2002).

When generating the instruction information, the communication device 100D inserts, in the instruction information, information (e.g. the above-mentioned common ID) that is associated with the selected snap image and used for specifying the snap image, as an example.

The communication device 100D transmits the instruction information generated in step S2002 to the other communication devices 100 (the communication devices 100E and 100F), as the image display instruction to display the snap image (step S2003). The instruction information transmission method is arbitrary, and the communication device 100D may transmit the instruction information to the communication devices 100E and 100F by unicast, multicast, broadcast, or the like.

Simultaneously with the generation and transmission of the instruction information in steps S2002 and S2003, the communication device 100D also starts the process of displaying the selected snap image on the display screen in the communication device 100D, based on the image display instruction input by the user in step S2001. The communication device 100D reads the snap image from the snap image holding unit 109 by the snap image reading unit 110, and outputs the snap image to the display device such as the monitor 300 connected via the information output interface 102 for display, together with the video information restored and output by the content data reception unit 106 (step S2004).

Meanwhile, upon receiving the instruction information from the communication device 100D, the other communication devices 100 (the communication devices 100E and 100F) each read the snap image (e.g. the snap image identified by the information for specifying the snap image) corresponding to the snap image selected in the communication device 100D from the snap image holding unit 109, and display the snap image on the display device such as the monitor 300, based on the received instruction information (steps S2005 and S2006).

When displaying the snap image in each communication device 100, for example, the screen display mode may be changed so that the content data reception unit 106 synthesizes the snap image with other video or changes the screen structure.

(GUI)

Figure 6:
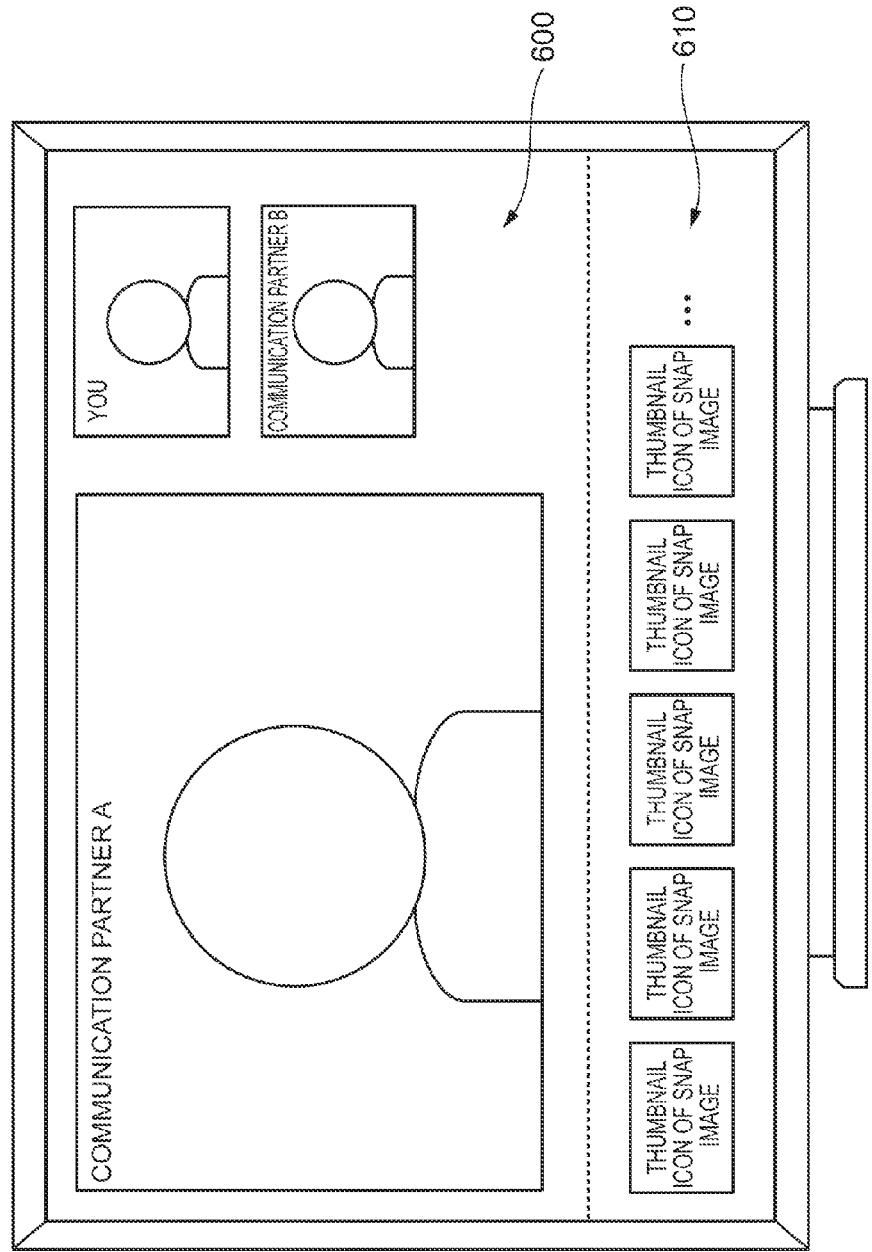
FIG. 6 is a diagram showing an example of a GUI of the communication device 100 according to an aspect of the present disclosure.

The following describes an example of a GUI in the communication device 100 according to the present disclosure. FIG. 6 is a diagram showing an example of a GUI in the communication device 100 according to an aspect of the present disclosure.

A video information display area 600 (the upper part of the screen) for displaying video information relating to content data received from each communication device 100 and a snap image display area 610 (the lower part of the screen) using thumbnail icons (images reduced in size) are shown in the example of the display in FIG. 6. A display screen during typical communication is shown in FIG. 6 as an example. For instance, in the video information display area 600, the video of a predetermined communication partner (communication partner A) is displayed in a large size (may be full-screen displayed) in a main display area (left in the video information display area 600), and the video of the user of the communication device 100 and another communication partner (communication partner B) are displayed in a sub-display area (right in the video information display area 600). A plurality of screen display modes in each of which the video from each location (each communication device 100), the video of the user, and other video such as material video or video captured by another camera are arranged in any combination and any size may be provided.

Moreover, a screen display mode for displaying thumbnail icons of stored snap images in a line in a part of the screen (e.g. a long narrow area along the vertical or horizontal edge) may be provided. FIG. 6 shows a state where the thumbnail icons of the stored snap images are displayed in the lower long narrow area of the screen by the screen display mode having the snap image display area 610.

For example, in the snap image display area 610, the thumbnail icons may be displayed from left to light in the order in which the snap images are stored, to allow the user to intuitively recognize the snap images in chronological order. Moreover, the user convenience with regard to snap image recognition and selection may be improved by displaying the thumbnail icons with numbers assigned to them, displaying the thumbnail icons each in association with information (e.g. the above-mentioned common ID) for specifying the snap image, or displaying the thumbnail icons each with the time at which the snap image is stored (or the elapsed time upon the image storage from the communication start).

The user may be allowed to input the screen display instruction while selecting the thumbnail icon of the snap image to be referred to, through a device (a remote control, a mouse, a keyboard, a panel, etc.) connected to the information input interface associated with the communication device 100. In the case where the user selects the thumbnail icon of the snap image and inputs the screen display instruction, for example, the selected snap image is displayed as a main image on the display screen (displayed in the main display area or full-screen displayed).

Furthermore, the snap image (the snap image including the same image content) corresponding to the selected snap image may be output to the display device such as the monitor 300 connected to each of the other communication devices 100, as mentioned above. In the case where the snap image is selected in any of the other communication devices 100, the corresponding snap image (the snap image including the same image content) may be output to the display device such as the monitor 300 connected to the communication device 100.

As a result, the snap image including the same image content and stored at the same timing is displayed in all locations in the communication. For example in the case where a predetermined topic is discussed again in a conference or the like, efficient re-discussion can be conducted while referring to a material (a material image previously transferred and stored as a snap image) of a previous question and answer session or the like. Here, since such a snap image of a material is held in each individual communication device 100, the snap image can be referred to in each location merely by transmitting and receiving the instruction information including the image display instruction. This eliminates the need to continuously retransmit the video of the material or the like, thus preventing a heavy load on communication traffic.

In addition, a part of the display screen may be used to display information such as information indicating that a snap image is being recorded or information indicating that another image storage instruction cannot be accepted (a new image storage instruction is blocked) throughout the block period, with the use of characters or icons (e.g. a mark suggestive of a still camera). In this way, it is possible to prevent the image storage instruction for the snap image including the same image content from being simultaneously input in another location, and notify the user that the input of the image storage instruction is disabled during the block period.

Moreover, according to an aspect of the present disclosure, in communication system, the communication device that is included in the plurality of communication devices and to which the image storage instruction has been input may generate instruction information including the image storage instruction, and transmit the instruction information to the plurality of communication devices except the communication device that generates the instruction information.

With this structure, the communication device to which the image storage instruction is input can issue the image storage instruction for the image including the same image content, to the communication device included in the communication system.

Moreover, according to an aspect of the present disclosure, in the communication system, a communication device transmitting the video information may change a communication mode to a mode for stabilizing video when the process of acquiring the image from the video information and storing the image is performed based on the image storage instruction.

With this structure, each communication device can store the image including the same image content, and also store the image of higher definition (image with high image resolution).

Moreover, according to an aspect of the present disclosure, in the communication system, a communication device receiving the video information may store the image after confirming stabilization of video when performing the process of acquiring the image from the video information and storing the image based on the image storage instruction.

With this structure, each communication device can store the image of higher definition (image with high image resolution).

Moreover, according to an aspect of the present disclosure, in the communication system, a block period during which a new image storage instruction to clip an image from the video information and store the image is blocked may be set when the process of acquiring the image from the video information and storing the image based on the image storage instruction when performing the process of acquiring the image from the video information and storing the image based on the image storage instruction.

With this structure, it is possible to prevent the storage instruction for the image including the same image content from being generated in a plurality of locations at the same time.

Moreover, according to an aspect of the present disclosure, in the communication system, the image acquired from the video information based on the image storage instruction in each of the plurality of communication devices may be assigned common information for specifying the image.

With this structure, the image stored in each individual communication device based on the specific image storage instruction can be identified and managed by the common information for specifying the image.

Moreover, according to an aspect of the present disclosure, in the communication system, one of the plurality of communication devices may generate the common information for specifying the image, and notify the common information for specifying the image to the plurality of communication devices except the communication device that generates the common information for specifying the image.

With this structure, the communication device authorized to assign the common information for specifying the image can be set so that the generation of the common information for specifying the image does not overlap in different locations.

Moreover, according to an aspect of the present disclosure, in the communication system, the communication device that generates the common information for specifying the image may be a communication device transmitting the video information or the communication device to which the image storage instruction has been input.

With this structure, for example when the communication device transmitting the video information transmits the information or when the communication device to which the image storage instruction is input transmits the instruction information including the image storage instruction, the common information for specifying the image can be assigned simultaneously.

Moreover, according to an aspect of the present disclosure, in the communication system, each of the plurality of communication devices may display the image associated with the common information for specifying the image in the case where an image display instruction to display the image has been input to one of the plurality of communication devices together with the common information for specifying the image.

With this structure, the communication device to which the image display instruction is input can issue the image display instruction for the image including the same image content, to the communication device included in the communication system.

Moreover, according to an aspect of the present disclosure, in the communication system, one of the plurality of communication devices may generate timing information defining a timing of acquiring the image from the video information and storing the image, and notify the timing information to the plurality of communication devices except the communication device that generates the timing information.

With this structure, the time discrepancy of the image acquisition process in each communication device can be reduced.

Moreover, according to an aspect of the present disclosure, in the communication system, the communication device that generates the timing information may be a communication device transmitting the video information or the communication device to which the image storage instruction has been input.

With this structure, for example when the communication device transmitting the video information transmits the information or when the communication device to which the image storage instruction is input transmits the instruction information including the image storage instruction, the timing information of the image acquisition process can be notified simultaneously.

Moreover, according to an aspect of the present disclosure, in the communication system, the timing information may include information indicating a time at which the image is acquired from the video information or a timing associated with the video information.

With this structure, the timing of performing the image acquisition process in each communication device can be clearly defined.

Moreover, an aspect of the present disclosure can include a communication device in a communication system including a plurality of communication devices for performing transmission and reception of content data with each other, the communication device including:

a content data transmission unit for generating transmission content data based on transmission video information supplied from a video information output device connected to the communication device, and transmitting the transmission content data to an other communication device included in the communication system;

a content data reception unit for restoring reception video information based on reception content data received from the other communication device included in the communication system, and outputting the reception video information; and an instruction information generation unit for generating, based on an image storage instruction that has been input to the communication device to instruct to acquire an image from specific video information from among the transmission video information and the reception video information and store the image, instruction information including an instruction to acquire the image from the specific video information and store the image, and transmitting the instruction information to the other communication device included in the communication system.

With this structure, each communication device can be instructed to share the image including the same image content in real time, while reducing traffic.

Moreover, an aspect of the present disclosure can include the communication device further including:

an instruction information interpretation unit for receiving, from the other communication device included in the communication system, instruction information including an image storage instruction to acquire an image from specific video information from among the transmission video information and the reception video information and store the image; and an image holding unit for holding the image acquired from the specific video information, wherein the instruction information generation unit or the instruction information interpretation unit:

instructs the content data transmission unit to acquire the image from the transmission video information and store the image in the image holding unit, based on the image storage instruction for the transmission video information that is being transmitted by the communication device; and instructs the content data reception unit to acquire the image from the reception video information and store the image in the image holding unit, based on the image storage instruction for the reception video information that is being received by the communication device.

With this structure, each communication device can share the image including the same image content in real time, while reducing traffic.

Moreover, according to an aspect of the present disclosure, the communication device may change a communication mode to a mode for stabilizing video relating to the transmission video information in the case of the image storage instruction to acquire the image from the transmission video information and store the image.

With this structure, each communication device can store the image including the same image content, and also store the image of higher definition (image with high image resolution).

Moreover, according to an aspect of the present disclosure, the communication device may store the image after confirming stabilization of video relating to the reception video information in the case of the image storage instruction to acquire the image from the transmission video information and store the image.

With this structure, each communication device can store the image of higher definition (image with high image resolution).

Moreover, according to an aspect of the present disclosure, the communication device sets a block period during which a new image storage instruction to acquire an image from the specific video information and store the image is blocked when acquiring the image from the specific video information and storing the image based on the image storage instruction.

With this structure, it is possible to prevent the storage instruction for the image including the same image content from being generated in a plurality of locations at the same time.

Moreover, according to an aspect of the present disclosure, the communication device may manage the image using common information for specifying the image, the common information being assigned in each of the plurality of communication devices.

With this structure, the image stored in each individual communication device based on the specific image storage instruction can be identified and managed by the common information for specifying the image.

Moreover, according to an aspect of the present disclosure, the communication device may generate and notify the common information for specifying the image to the other communication device included in the communication system.

With this structure, the communication device authorized to assign the common information for specifying the image can be set so that the generation of the common information for specifying the image does not overlap in different locations.

Moreover, according to an aspect of the present disclosure, the communication device may generate the common information for specifying the image in the case of the image storage instruction to acquire the image from the transmission video information and store the image or in the case of transmitting the instruction information to the other communication device.

With this structure, for example when the communication device transmitting the video information transmits the information or when the communication device for generating the instruction information transmits the information, the common information for specifying the image can be assigned simultaneously.

Moreover, according to an aspect of the present disclosure, the communication device may display the image associated with the common information for specifying the image in the case where an image display instruction to display the image has been input to the communication device together with the common information for specifying the image or in the case of receiving instruction information including the image display instruction from the other communication device.

With this structure, the communication device to which the image display instruction is input can issue the image display instruction for the image including the same image content, to the communication device included in the communication system.

Moreover, according to an aspect of the present disclosure, the communication device may generate and notify timing information defining a timing of acquiring the image from the specific video information and storing the image to the other communication device.

With this structure, the time discrepancy of the image acquisition process in each communication device can be reduced.

Moreover, according to an aspect of the present disclosure, the communication device may generate the timing information in the case of the image storage instruction to acquire the image from the transmission video information and store the image or in the case of transmitting the instruction information to the other communication device.

With this structure, for example when the communication device transmitting the video information transmits the information or when the communication device for generating the instruction information transmits the instruction, the timing information of the image acquisition process can be notified simultaneously.

Moreover, according to an aspect of the present disclosure, in the communication device, the timing information may include information indicating a time at which the image is acquired from the video information or a timing associated with the video information.

With this structure, the timing of performing the image acquisition process in each communication device can be clearly defined.

Moreover, an aspect of the present disclosure can include a communication device, in a communication system including a plurality of communication devices, for transmitting content data to an other communication device, the communication device including:

a content data transmission unit for generating the content data based on transmission video information supplied from a video information output device connected to the communication device, and transmitting the content data to the other communication device included in the communication system; and an instruction information generation unit for generating, based on an image storage instruction that is input to the communication device to instruct to clip an image from the transmission video information and store the image, instruction information including an instruction to clip the image from the transmission video information and store the image, and transmitting the instruction information to the other communication device included in the communication system.

Moreover, an aspect of the present disclosure can include the above-mentioned communication device further including an image holding unit for holding the image clipped from the transmission video information, wherein the instruction information generation unit instructs the content data transmission unit to clip the image from the transmission video information and store the image in the image holding unit, based on the image storage instruction for the transmission video information that is being transmitted by the communication device.

Moreover, an aspect of the present disclosure can include a communication device, in a communication system including a plurality of communication devices, for transmitting content data to an other communication device, the communication device including:

a content data transmission unit for generating the content data based on transmission video information supplied from a video information output device connected to the communication device, and transmitting the content data to the other communication device included in the communication system; and an instruction information interpretation unit for receiving, from the other communication device included in the communication system, instruction information including an image storage instruction to clip an image from the transmission video information and store the image.

Moreover, an aspect of the present disclosure can include the above-mentioned communication device further including an image holding unit for holding the image clipped from the transmission video information, wherein the instruction information interpretation unit instructs the content data transmission unit to clip the image from the transmission video information and store the image in the image holding unit, based on the image storage instruction for the transmission video information that is being transmitted by the communication device.

Moreover, an aspect of the present disclosure can include a communication device, in a communication system including a plurality of communication devices, for receiving content data from an other communication device, the communication device including:

a content data reception unit for restoring reception video information based on the content data received from the other communication device included in the communication system, and outputting the reception video information; and an instruction information generation unit for generating, based on an image storage instruction that is input to the communication device to instruct to clip an image from the reception video information and store the image, instruction information including an instruction to clip the image from the specific video information and store the image, and transmitting the instruction information to the other communication device included in the communication system.

Moreover, an aspect of the present disclosure can include the above-mentioned communication device further including an image holding unit for holding the image clipped from the specific video information, wherein the instruction information generation unit instructs the content data reception unit to clip the image from the reception video information and store the image in the image holding unit, based on the image storage instruction for the reception video information that is being received by the communication device.

Moreover, an aspect of the present disclosure can include a communication device, in a communication system including a plurality of communication devices, for receiving content data from an other communication device, the communication device including:

a content data reception unit for restoring reception video information based on the content data received from the other communication device included in the communication system, and outputting the reception video information; and an instruction information interpretation unit for receiving, from the other communication device included in the communication system, instruction information including an image storage instruction to clip an image from the reception video information and store the image.

Moreover, an aspect of the present disclosure can include the above-mentioned communication device further including an image holding unit for holding the image clipped from the specific video information, wherein the instruction information interpretation unit instructs the content data reception unit to clip the image from the reception video information and store the image in the image holding unit, based on the image storage instruction for the reception video information that is being received by the communication device.

For example, the above-mentioned aspects of the present disclosure may be combined as appropriate. An aspect of the present disclosure may be realized not only by the communication system or the communication device, but also by a method executed by the communication device, a program for causing a computer to execute the method, a recording medium in which the program is recorded, or the like.

The functional blocks described in the above embodiment may be typically realized as LSI (Large Scale Integration) which is an integrated circuit. The functional blocks may each be individually implemented as one chip, or may be partly or wholly implemented on one chip. Though LSI is mentioned here, the integrated circuit may be called IC, system LSI, super LSI, or ultra LSI, depending on the degree of integration. Moreover, the integrated circuit technology is not limited to LSI, and may be realized by a dedicated circuit or a general-purpose processor. An FPGA (Field Programmable Gate Array) which can be programmed or a reconfigurable processor which is capable of reconfiguring connections and settings of circuit cells in LSI after LSI manufacturing may be used. Furthermore, when an integrated circuit technology that replaces LSI emerges from the development of semiconductor technologies or other derivative technologies, such a technology may be used to integrate the functional blocks. For instance, biotechnology may be adapted in this way.

Industrial Applicability

An aspect of the present disclosure enables each communication device to share an image including the same image content in real time, and so is widely applicable to transfer techniques for transmitting or receiving content data including at least video information, conference systems for realizing teleconferencing using communication devices, and so on.

The invention claimed is:

1. A communication system including a plurality of communication devices for performing transmission and reception of content data with each other,
wherein each of the plurality of communication devices performs a process of acquiring an image from video information and storing the image based on an image storage instruction in the case where the image storage instruction to acquire the image from the video information included in the content data transmitted and received in the communication system and store the image has been input to one of the plurality of communication devices.

2. The communication system according to claim 1, wherein the communication device that is included in the plurality of communication devices and to which the image storage instruction has been input generates instruction information including the image storage instruction, and transmits the instruction information to the plurality of communication devices except the communication device that generates the instruction information.

3. The communication system according to claim 1, wherein a communication device transmitting the video information changes a communication mode to a mode for stabilizing video when the process of acquiring the image from the video information and storing the image is performed based on the image storage instruction.

4. The communication system according to claim 1, wherein a communication device receiving the video information stores the image after confirming stabilization of video when performing the process of acquiring the image from the video information and storing the image based on the image storage instruction.

5. The communication system according to claim 1, wherein a block period during which a new image storage instruction to acquire an image from the video information and store the image is blocked is set when the process of acquiring the image from the video information and storing the image based on the image storage instruction when performing the process of acquiring the image from the video information and storing the image based on the image storage instruction.

6. The communication system according to claim 1, wherein the image acquired from the video information based on the image storage instruction in each of the plurality of communication devices is assigned common information for specifying the image.

7. The communication system according to claim 6, wherein one of the plurality of communication devices generates the common information for specifying the image, and notifies the common information for specifying the image to the plurality of communication devices except the communication device that generates the common information for specifying the image.

8. The communication system according to claim 7, wherein the communication device that generates the common information for specifying the image is a communication device transmitting the video information or the communication device to which the image storage instruction has been input.

9. The communication system according to claim 6, wherein each of the plurality of communication devices displays the image associated with the common information for specifying the image in the case where an image display instruction to display the image has been input to one of the plurality of communication devices together with the common information for specifying the image.

10. The communication system according to claim 1, wherein one of the plurality of communication devices generates timing information defining a timing of acquiring the image from the video information and storing the image, and notifies the timing information to the plurality of communication devices except the communication device that generates the timing information.

11. The communication system according to claim 10, wherein the communication device that generates the timing information is a communication device transmitting the video information or the communication device to which the image storage instruction has been input.

12. The communication system according to claim 10, wherein the timing information includes information indicating a time at which the image is acquired from the video information or a timing associated with the video information.

13. A communication device in a communication system including a plurality of communication devices for performing transmission and reception of content data with each other, the communication device comprising:
a content data transmission unit for generating transmission content data based on transmission video information supplied from a video information output device connected to the communication device, and transmitting the transmission content data to an other communication device included in the communication system;
a content data reception unit for restoring reception video information based on reception content data received from the other communication device included in the communication system, and outputting the reception video information; and
an instruction information generation unit for generating, based on an image storage instruction that has been input to the communication device to instruct to acquire an image from specific video information from among the transmission video information and the reception video information and store the image, instruction information including an instruction to acquire the image from the specific video information and store the image, and transmitting the instruction information to the other communication device included in the communication system.

14. The communication device according to claim 13, further comprising:
an instruction information interpretation unit for receiving, from the other communication device included in the communication system, instruction information including an image storage instruction to acquire an image from specific video information from among the transmission video information and the reception video information and store the image; and
an image holding unit for holding the image acquired from the specific video information,
wherein the instruction information generation unit or the instruction information interpretation unit:
instructs the content data transmission unit to acquire the image from the transmission video information and store the image in the image holding unit, based on the image storage instruction for the transmission video information that is being transmitted by the communication device; and
instructs the content data reception unit to acquire the image from the reception video information and store the image in the image holding unit, based on the image storage instruction for the reception video information that is being received by the communication device.

15. The communication device according to claim 13, wherein the communication device changes a communication mode to a mode for stabilizing video relating to the transmission video information in the case of the image storage instruction to acquire the image from the transmission video information and store the image.

16. The communication device according to claim 13, wherein the communication device stores the image after confirming stabilization of video relating to the reception video information in the case of the image storage instruction to acquire the image from the transmission video information and store the image.

17. The communication device according to claim 13, wherein the communication device sets a block period during which a new image storage instruction to acquire an image from the specific video information and store the image is blocked when acquiring the image from the specific video information and storing the image based on the image storage instruction.

18. The communication device according to claim 13, wherein the communication device manages the image using common information for specifying the image, the common information being assigned in each of the plurality of communication devices.

19. The communication device according to claim 18, wherein the communication device generates and notifies the common information for specifying the image to the other communication device included in the communication system.

20. The communication device according to claim 19, wherein the communication device generates the common information for specifying the image in the case of the image storage instruction to acquire the image from the transmission video information and store the image or in the case of transmitting the instruction information to the other communication device.

21. The communication device according to claim 18, wherein the communication device displays the image associated with the common information for specifying the image in the case where an image display instruction to display the image has been input to the communication device together with the common information for specifying the image or in the case of receiving instruction information including the image display instruction from the other communication device.

22. The communication device according to claim 13, wherein the communication device generates and notifies timing information defining a timing of acquiring the image from the specific video information and storing the image to the other communication device.

23. The communication device according to claim 22, wherein the communication device generates the timing information in the case of the image storage instruction to acquire the image from the transmission video information and store the image or in the case of transmitting the instruction information to the other communication device.

24. The communication device according to claim 22, wherein the timing information includes information indicating a time at which the image is acquired from the specific video information or a timing associated with the specific video information.

* * * * *